US007698853B2

(12) United States Patent  
Ragon et al.

(10) Patent No.: US 7,698,853 B2
(45) Date of Patent: Apr. 20, 2010

(54) TERMITE CONTROL METHODS AND APPARATUS

(75) Inventors: Kevin W. Ragon, Sturgis, MS (US); J. Patrick Donohoe, Starkville, MS (US); Terry Amburgey, Sturgis, MS (US); Michael Sanders, Sturgis, MS (US)

(73) Assignee: Mississippi State University Research and Technology Corporation, Mississippi State, MS (US)

( * ) Notice: Subject to any disclaimer, the term of this patent is extended or adjusted under 35 U.S.C. 154(b) by 213 days.

(21) Appl. No.: 11/235,109

(22) Filed: Sep. 27, 2005

(65) Prior Publication Data
US 2007/0068067 A1   Mar. 29, 2007

(51) Int. Cl.
*A01M 17/00* (2006.01)
*A01M 1/22* (2006.01)
*A01M 1/02* (2006.01)
*A01M 1/20* (2006.01)

(52) U.S. Cl. .................... 43/132.1; 43/124; 367/139

(58) Field of Classification Search ............... 43/132.1, 43/107, 112, 124; 367/139; 340/384.2; 116/22 A
See application file for complete search history.

(56) References Cited

U.S. PATENT DOCUMENTS

| 4,223,468 | A | * | 9/1980 | Lawrence | 43/132.1 |
|---|---|---|---|---|---|
| 4,366,644 | A | * | 1/1983 | Lawrence | 43/132.1 |
| 4,782,623 | A | * | 11/1988 | Lawrence | 43/132.1 |
| 4,870,779 | A | * | 10/1989 | Johnson et al. | 43/124 |
| 4,982,100 | A | * | 1/1991 | Harding, Jr. | 250/504 R |
| 5,210,719 | A | * | 5/1993 | Lawrence | 43/132.1 |
| 5,424,551 | A | * | 6/1995 | Callahan | 43/132.1 |
| 5,442,876 | A | * | 8/1995 | Pedersen | 43/132.1 |
| 5,473,836 | A | * | 12/1995 | Liu | 43/124 |
| 5,575,106 | A | * | 11/1996 | Martin et al. | 43/132.1 |
| 5,896,696 | A | * | 4/1999 | Stokes et al. | 43/132.1 |
| 5,930,946 | A | * | 8/1999 | Mah | 43/124 |
| 5,950,353 | A | * | 9/1999 | Johnson et al. | 43/58 |
| 6,047,494 | A | * | 4/2000 | Johnson et al. | 43/58 |
| 6,052,066 | A | * | 4/2000 | Su | 43/132.1 |
| 6,255,959 | B1 | * | 7/2001 | Lake et al. | 43/132.1 |
| 6,313,643 | B1 | * | 11/2001 | Tirkel et al. | 342/27 |
| 6,568,123 | B2 | * | 5/2003 | Nelson et al. | 43/132.1 |
| 6,801,131 | B2 | * | 10/2004 | Donskoy et al. | 340/573.1 |
| 6,837,001 | B2 | * | 1/2005 | Amburgey et al. | 43/132.1 |
| 6,886,292 | B2 | * | 5/2005 | Studer et al. | 43/112 |
| 7,020,996 | B2 | * | 4/2006 | Beroza et al. | 43/132.1 |
| 7,106,216 | B1 | * | 9/2006 | Maher | 340/384.2 |
| 7,218,234 | B2 | * | 5/2007 | Tirkel | 43/132.1 |
| 7,509,770 | B2 | * | 3/2009 | Gardner et al. | 43/107 |

(Continued)

FOREIGN PATENT DOCUMENTS

CN          1712080 A   *  12/2005

(Continued)

*Primary Examiner*—Darren W Ark
(74) *Attorney, Agent, or Firm*—Lawrence Arthur Schemmel

(57) ABSTRACT

The present invention provides methods and apparatus for controlling insect population or activity by using electromagnetic field source of certain frequency and intensity coupled with insect food sources/attractants. The present invention can be used to protect a natural or man-made structure from termite infestation. The present invention can also be used for controlling activity of other social insects such as ants, bees and wasps.

11 Claims, 26 Drawing Sheets

U.S. PATENT DOCUMENTS

| | | | |
|---|---|---|---|
| 7,541,936 B2 * | 6/2009 | Wijenberg et al. | 43/132.1 |
| 2003/0014907 A1 * | 1/2003 | Amburgey et al. | 43/132.1 |
| 2005/0039379 A1 * | 2/2005 | Pollinger | 43/132.1 |
| 2005/0134466 A1 * | 6/2005 | Tirkel | 43/132.1 |
| 2007/0107297 A1 * | 5/2007 | Wijenberg et al. | 43/107 |
| 2007/0137096 A1 * | 6/2007 | Ragon et al. | 43/132.1 |
| 2009/0192763 A1 * | 7/2009 | Gardner et al. | 43/98 |

FOREIGN PATENT DOCUMENTS

| | | | |
|---|---|---|---|
| DE | 19815916 A1 * | 11/1998 | |
| GB | 2061689 A * | 5/1981 | |
| JP | 05103571 A * | 4/1993 | |
| JP | 06237677 A * | 8/1994 | |
| JP | 2000078931 A * | 3/2000 | |
| JP | 2000312552 A * | 11/2000 | |
| JP | 2002000153 A * | 1/2002 | |
| WO | WO 03/022315 A2 * | 3/2003 | |
| WO | WO 03084320 A1 * | 10/2003 | |
| WO | WO 2007059075 A1 * | 5/2007 | |

\* cited by examiner

Figure 23

TERMITE CONTROL METHODS AND APPARATUS

This invention was made with Government support under U.S. Department of Agriculture/Forest Service Grant Number 04-JV-11111136-104. The Government may have certain rights in this invention.

BACKGROUND OF THE INVENTION

1. Field of the Invention

This invention relates to the field of insect control technology, and more specifically, to methods and apparatus for controlling termite activity, movement and population using radio waves (e.g. electromagnetic fields) within a certain frequency range. The methods and apparatus may be used to protect a structure from termite infestation.

2. Background of the Technology

Untreated termite infestations lead to irreversible structural damage in buildings throughout the world. As a result, a myriad of treatments to control or destroy termite populations have been developed. Because of the potential negative environmental impact of insecticides, environmentally friendly alternatives have been the primary focus of the latest research.

A significant amount of prior art focuses on the use of electromagnetic fields to control (repel and/or negatively affect) termites. U.S. Pat. No. 5,473,836, issued to Liu discloses a method for removing insects from "hidden places" by inducing an electromagnetic field to create physical vibrations. U.S. Pat. No. 5,930,946 issued to Mah discloses a method for creating an electromagnetic field to which pests react adversely. U.S. Pat. No. 5,442,876 issued to Pederson discloses a method for controlling termites by heating the area where termites are located to temperatures which are lethal to living organisms by means of electromagnetic energy. U.S. Pat. No. 4,870,779 issued to Bergerioux et al. discloses a method in which a low frequency, randomly varying magnetic field is generated by a device such that it interacts with the earth's geomagnetic field to eliminate (repel) rodents and similar pests located above and below ground level in the area surrounding the device.

The use of electrical energy has also been employed in efforts to eliminate (repel and/or negatively affect) termites. U.S. Pat. No. 5,210,719 issued to Lawrence discloses an apparatus and method which uses a sweep-frequency, high voltage generator coupled to an applicator gun for feeding electric power into pest-infested dielectrics, for example termite-infested wood. U.S. Pat. No. 4,366,644 issued to Lawrence discloses a method that involves the application of broadband radio frequency or multifrequency high-voltage electrical energy to termite shelter tubes, galleries and nests and to the bodies of termites in those areas. The '644 patent describes methods to kill termites directly by electroshock or indirectly by creating interference with the digestive processes of termites. U.S. Pat. No. 4,782,623 issued to Lawrence discloses an apparatus and method, which uses a phase-locked high voltage, high frequency pulse generator capable of "quasi-unlimited" power output and an applicator gun for feeding electric power into pest-infested dielectrics, for example termite infested wood. U.S. Pat. No. 4,223,468 issued to Lawrence discloses a method that involves killing termites by the application of broadband, high voltage electrical energy to habitats of termites.

The application of microwave energy has also been employed in the attempt to control (repel and/or negatively affect) termites. U.S. Pat. No. 5,575,106 issued to Martin et al. discloses a method of using low voltage "microwave horns" to kill termite populations. U.S. Pat. No. 5,896,696 issued to Stokes et al. discloses an apparatus and method for generating and radiating energy at specific wavelengths for the purpose of adversely affecting the nervous systems of "small insects."

While these environmentally friendly methods of controlling termites have avoided the use of conventional pesticides, they have failed to adequately protect termite-susceptible structures from infestation. U.S. Pat. No. 6,837,001 to Amburgey et al. describes a method to attract termites to a selected area using radio waves and thereby provide protection from termites for other adjacent areas. The frequency of the radio waves ranged from about 1-100 megahertz with intensities 1-100 K watts.

SUMMARY OF THE INVENTION

One aspect of the present invention relates to a method for controlling termite movement or population by (1) positioning an electromagnetic field source at a frequency of less than 4000 Hz with an intensity of 1 milliwatt to 1 kilowatt as a termite attractant in the proximity of a target location that is inhabitable by termites and (2) producing electromagnetic fields to attract termites towards the frequency field source and away from the undesired location. The method is also applicable to other social insects such as ants, bees and wasps.

In a preferred embodiment, the termite attractant comprises a termite-degradable material such as wood. In another preferred embodiment, the termite attractant comprises a toxic bait, a light trap, or a termite trap that is capable of eliminating the attracted termites.

Another aspect of the invention relates to a system for controlling termite activity or population, comprising an electromagnetic field source at a frequency of less than 4000 Hz with an intensity of 1 milliwatt to 1 kilowatt; and a termite attractant comprising a termite degradable material. The system can also be used to control activity of other social insects such as ants, bees and wasps.

In a preferred embodiment, the electromagnetic field source comprises a voltage portion and an antenna portion, wherein said antenna portion is mountable on or adjacent to the termite attractant.

BRIEF DESCRIPTION OF THE FIGURES

FIGS. 19A and 19B show termites consuming the wood, filling the coils with sand and chewed plastic from the wire coils in the shelter tubing in the right side photo.

FIG. 23 is a bar graph summarizing the replicated results of the experiments described in FIGS. 3-22.

DETAILED DESCRIPTION OF THE INVENTION

The following detailed description is presented to enable any person skilled in the art to make and use the invention. For purposes of explanation, specific details are set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

The present invention is based on the surprising discovery that termites are attracted by electromagnetic fields in a frequency of less than 4000 Hz. One aspect of the present invention, as described below and shown in the accompanying figures, relates to a method for controlling termites by attracting termites either into a termite control device or to an area away from an infested structure to an area using radio waves (e.g. electromagnetic fields) in the frequency range of 1-3999 Hz.

Figure 1A:
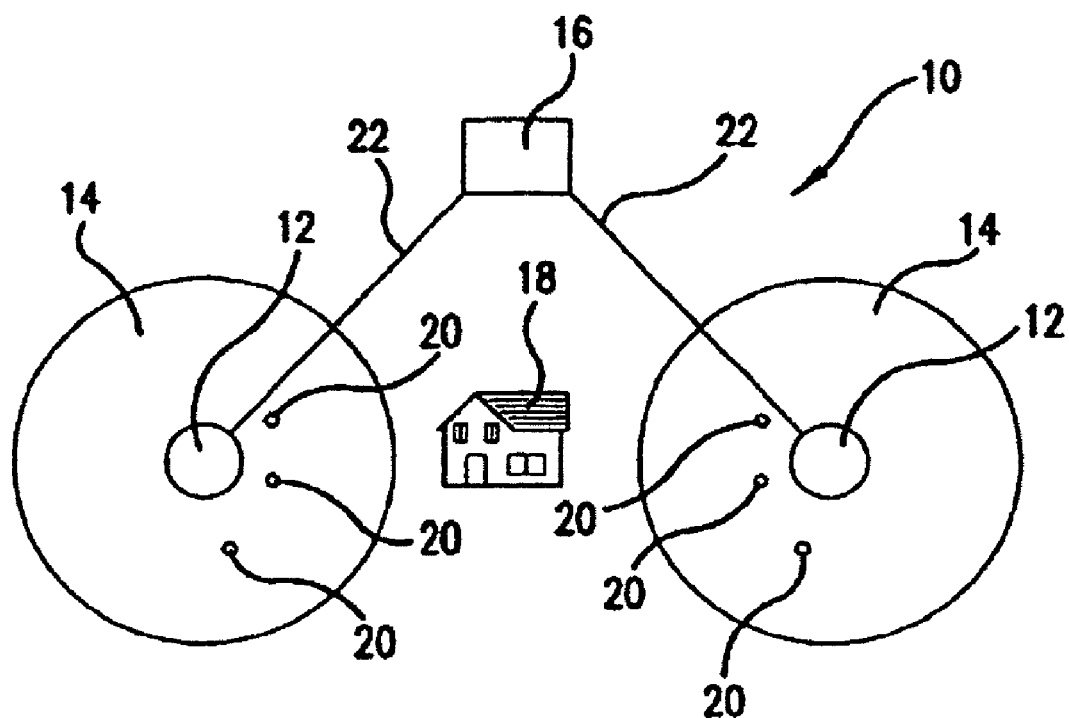
FIGS. 1A-1D show diagram representations of different embodiments of the electromagnetic field generating system of the present invention.
Figure 1B:
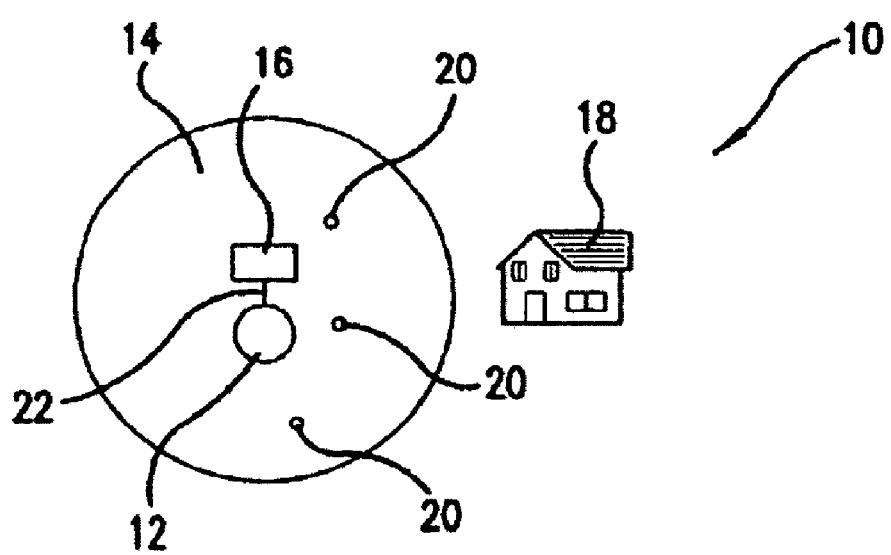
Figure 1C:
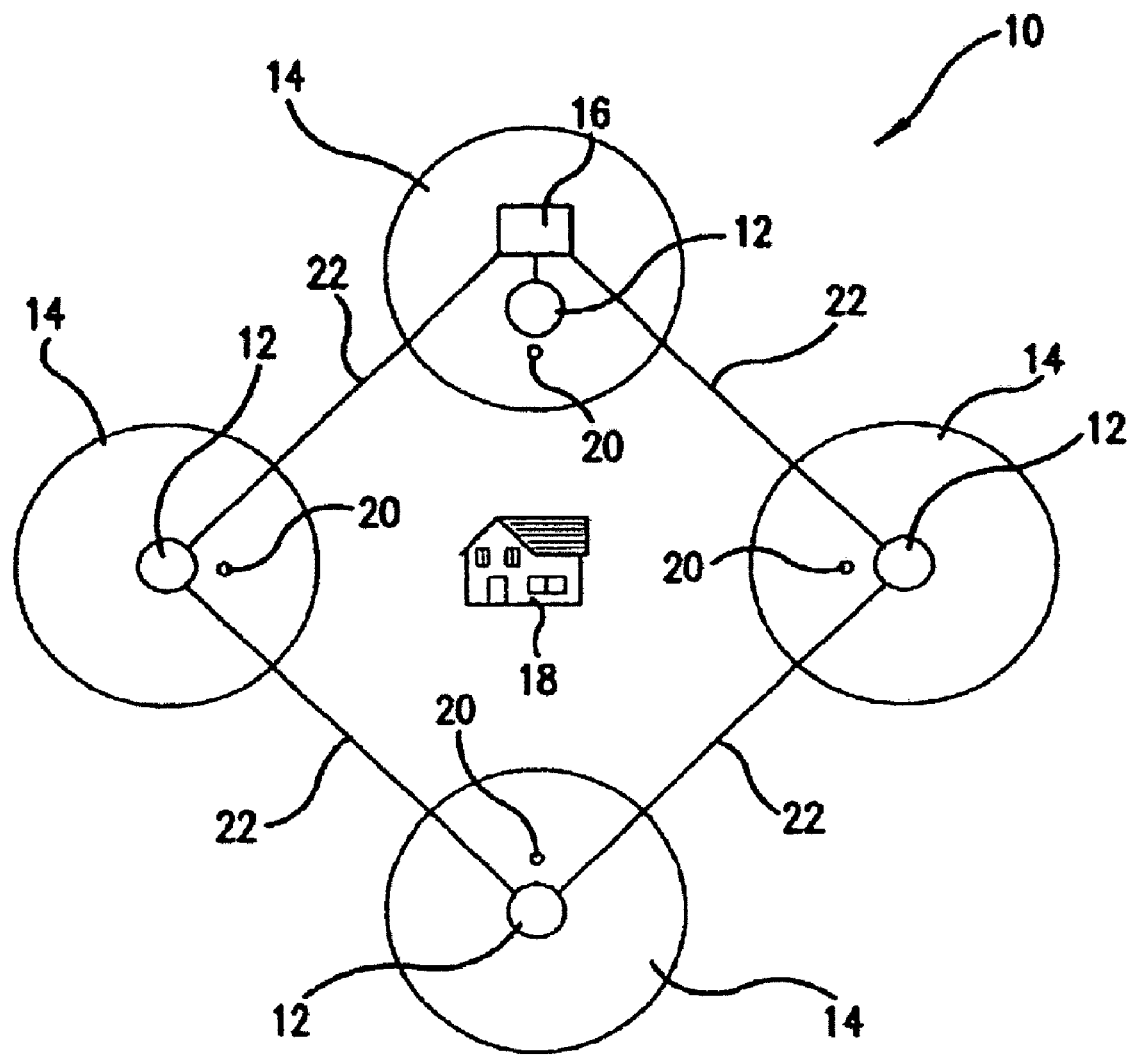
Figure 1D:
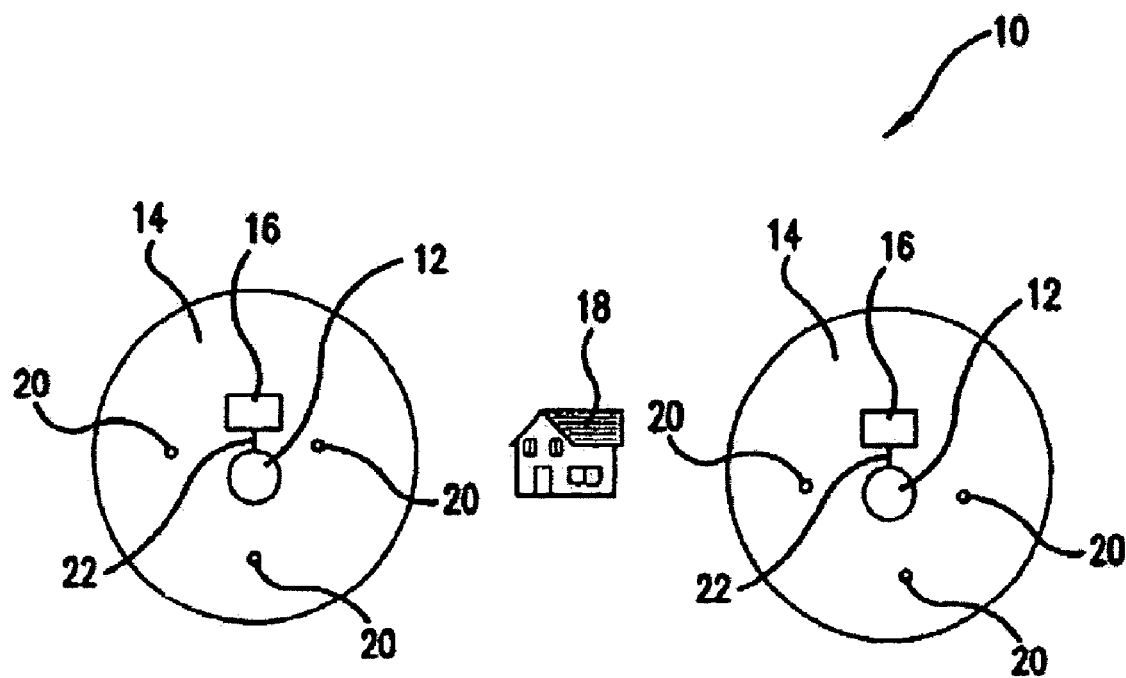

Electromagnetic fields in the frequency range of 1-4000 Hz can be generated by an oscillator and antenna and is well known to one skilled in the art [Constantine Balanis, "Antenna Theory, Analysis and Design, 3rd. Ed.", John Wiley and Sons, (2005); Warren Stutzmann, et al., "Antenna Theory and Design, 2nd. Ed.", John Wiley and Sons, (1998)]. Depending on the size of a protected area, the power output of the electromagnetic field source can vary from about 1 milliwatt to about 1 kilowatt. As shown in FIGS. 1A-1D, the electromagnetic field generation system, generally shown at 10, can be configured to position at least one electromagnetic source 12 in a transmission area 14. An electromagnetic field generation system 16 is designed to provide electromagnetic fields in the range of 1-3999 Hz within a transmission area 14. As shown in FIGS. 1A and 1C, the transmitter 16 can be operationally connected to more than one transmitting device 12.

The electromagnetic field transmitting system 10 can have varied configurations where the transmitting device 12 can be positioned adjacent to or circumferentially disposed around a natural or man-made termite-degradable structure 18 for which protection from termite damage is desired (FIGS. 1A-D). The structure 18 can have a degradable component and therefore be susceptible to termite damage. The different transmitting system configurations depicted in FIGS. 1A-1D are non-limiting examples, the pattern of which can be widely varied without departing from the concept of the present invention.

Within the effective range of the transmission area 14, natural or man-made termite-degradable materials can be positioned so as to provide a food source/attractant 20 for termites that is localized within the transmission area 14. Inclusion of the food source/attractant 20, in addition to increasing the effectiveness of the termite-attraction of the transmitting device 12, also provides foci for termite infestation in the transmission area 14. By focusing the relocation of the termites to the attractant 20, subsequent containment, collection, or elimination of the termites by conventional means can be facilitated. One skilled in the art would understand that the size of the transmission area 14 is determined by the design and output power of the electromagnetic field 12. The electromagnetic field 12 or antenna portions of the radio wave transmitters 12, as well as the attractant 20, should be placed in sufficient proximity of the termite degradable structure so as the food source/attractant directs the termites away from the termite degradable structure.

The termite food source/attractant 20 can be anything that attracts termites, including but not limited to, bait stations, termite traps, and light traps. A bait station is typically comprised of a non-biodegradable holder (e.g. plastic) that is placed in the substrate (soil) and holds a cellulose material (termite food/wood or pure cellulose monitoring stake). The bait stations are then placed near a structure (e.g., a house) in areas that are susceptible to termite attack. If termites inhabit the bait station the cellulose material can be removed and a cellulose/toxicant mixture (bait matrix) can be added to the bait station to eliminate the termite colony. Bait stations are commercially available from, for example, Dow Agro-Sciences. A termite trap is simply a container, such as a bucket with small openings or a milk crate, filled with wood and placed in the substrate near a termite infested site. A termite trap is similar to a bait station but is larger in size and is used to collect termites for laboratory trials. [see e.g., Tamashiro, et al., *Environmental Entomology* 2:721-722 (1973)]. Light traps are generally constructed using a light, a sticky pad (e.g., rodent pad with a strong adhesive for trapping small rodents) and a structure to mount the two close together to attract Formosan subterranean termite altaes (winged termites). More information on the light trap can be found at (http://www.ars.usda.gov/is/AR/archive/oct98/term 1098.htm).

In one embodiment, the food source/attractant 20 comprises natural or man-made termite-degradable materials that attract termites away from the structure 18 but do not kill the attracted termites. In another embodiment, the food source/attractant 20 comprises materials (such as toxic baits) and/or devices (such as termite traps) that are capable of killing the attracted termites.

The method is applicable to all termite species including, but not limited to, subterranean termites such as *Coptotermes* spp., *Reticulitermes* spp., and Drywood termites (*Cryptotermes, Kalotermes*, ect.). species. The method is also applicable to other social insects such as ants, bees and wasps. Unlike conventional remedial termite control methods, the present invention provides a method to control subterranean, surface, and dispersal flight movement of termites before or after infestation of an area in need of protection. The inclusion of attraction augmentation in the electromagnetic field transmitting system 10 of the present invention further permits the localization by directing movement of the termites within the transmission area.

The present invention can be used to attract termites to the transmission area 14 for containment, collection, study, or elimination. By properly positioning the transmitting system 10 relative to a natural or man-made structure 18 for which termite protection is desired, the termites can be attracted away from the material or structure 18 that is to be protected and drawn towards the transmitting system 10. Non-limiting examples of transmitting system configurations which can be used to provide protection for a material or object, such as a house, fence, utility pole, or any material subject to termite infestation are shown in FIGS. 1A-D.

One skilled in the art will recognize that the electromagnetic fields transmitting system 10 can also be used within a termite degradable structure 18, such as a house. In one embodiment, the electromagnetic field transmitting system 10 comprises one or more small electromagnetic field wave transmitters 12 and one or more food source/attractants 20 that are capable of killing the attracted termites. The electromagnetic field wave transmitters 12 and the food source/attractants 20 are placed near or around a termite infested area within the termite degradable structure 18. The food source/attractants 20, with the augmentation from the electromagnetic fields emitted from the electromagnetic field transmitters 12, attract termites away from the infested area and eliminate the attracted termites. The method is described in more detail in U.S. Pat. No. 6,837,001 to Amburgey et al., which is herein incorporated by reference. In one embodiment, the electromagnetic field transmitters 12 are coil shaped antennas capable of generating ELF, SLF, ULF and VLF electromagnetic fields.

Figure 2:
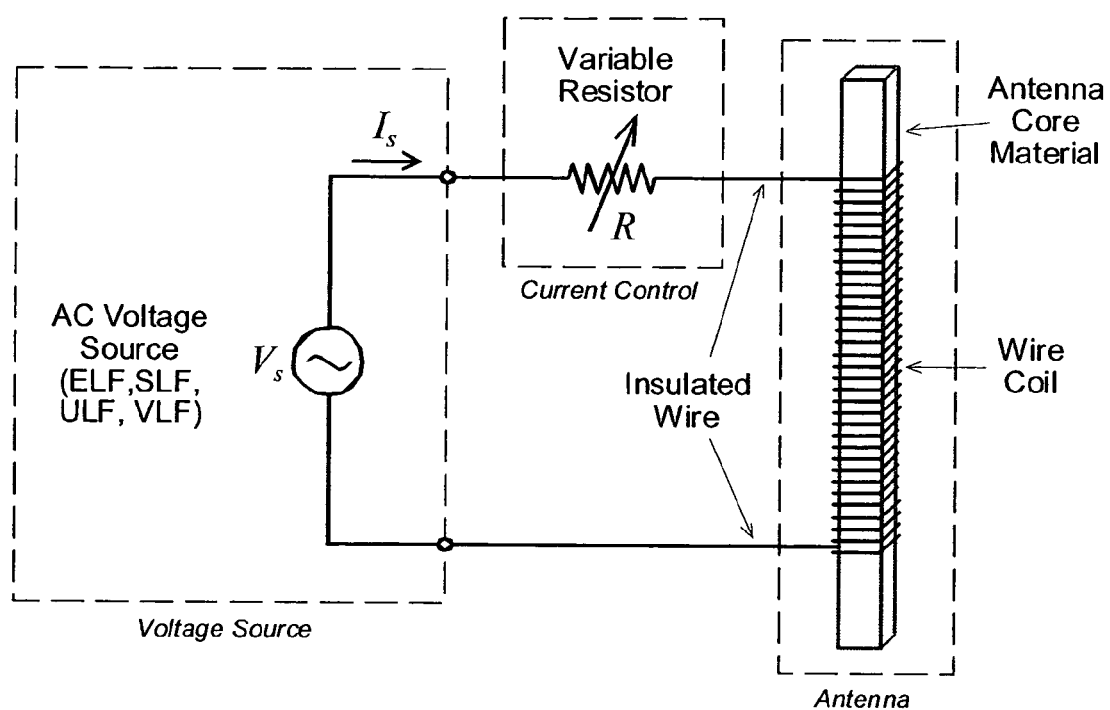
FIG. 2 is a schematic showing a device capable of generating electromagnetic fields with extremely low frequencies (ELF), super low frequencies (SLF), ultra low frequencies (ULF) or very low frequencies (VLF).

FIG. 2 shows an embodiment of a device for generating very-low to extra-low frequency radio waves in a restricted area. The device comprises three basic components: (1) a voltage source, (2) a current control circuit and (3) a coil. As shown in FIG. 2, the alternating current (AC) voltage source Vs produces a sinusoidal voltage at a single frequency within the ELF (3-30 Hz), SLF (30-300 Hz), ULF (300 Hz-3 kHz) or VLF (3-30 kHz) bands. The actual frequency used will depend on the function of the device to attract (3999 Hz-0.0009 Hz) or repel (4000 Hz-5 KHz) social insects such as termites. The amplitude of the sinusoidal voltage will depend on the designed range of the device for the desired application. The current control circuit consists of a variable resistor R that is used to control the source current Is. The source current passes through a coil that radiates the desired electromagnetic field at the frequency of the source. The coil geometry shown in FIG. 2 is a multiple-turn loop coil. The coil core material will depend on the application of the device to attract or repel a particular social insect. The multiple-turn loop coil was used in the examples described below. Other coil geometrics may also be used.

The present invention is further illustrated by the following examples which should not be construed as limiting. The contents of all references, patents and published patent applications cited throughout this application, as well as the Figures and Tables, are incorporated herein by reference.

EXAMPLES

Termite Collection

Formosan subterranean Termites (*Coptotermes formosanus*, FST) and Eastern subterranean Termites (*Reticulitermes flavipes*, EST) were collected from and around the Mississippi State University (MSU) Formosan Termite Research Facility and the Stennis Space Center using methods described by Tamashiro et al. [Tamashiro, et al., *Environmental Entomology* 2:721-722, (1973)] and Kard et al. [Kard et al., *Sociobiology* 41:2:295-511, (2003)]. If stored, termites were held at the facility using methods described in the referenced articles.

Test Chamber

Two clear Plexiglas sheets 105 cm×105 cm sandwiched a sand media similar to Puche and Su, 2001 [*J. Econ Entomol.* 94:1398-1404, (2001)]. The Plexiglas was separated on four sides by acrylic spacers 2.54 cm×2.54 cm×105 cm. A piece of weathered southern yellow pine sapwood (SYP, *Pinus* spp.) 1.27 cm×1.27 cm×20 cm was used as a control 30 cm from the center termite release point and a source producing electromagnetic fields (very low frequencies, VLF) was attached to a SYP specimen similar to the control and was installed on the opposing side of the termite release point at the same distance. Both pieces of wood were aged by being cribbed-stacked outside for 6 months prior to the use in tests. The Plexiglas, inside of the spacers, was filled with 1866 g (1200 ml) of pool-sand that was sifted and moistened with a spray of 400 ml of de-ionized water.

Test Method

One thousand termites of either species (FST and EST) were used in each center release test chamber (one termite species per test unit). Each species was used in ratios as they are found in nature. A 20% soldier to worker ratio for FST and a 1% soldier to worker ratio for EST was used. Termites were counted at the end of 14 days to determine which food choice was desired.

In this example, electromagnetic fields of the appropriate frequency were generated using a function generator producing an Ac current. The coil was a SYP stake with 18 gauge wire coiled around it in 100 loops. The desired intensity in the first test was 0.720 mA with various test frequencies and doubled for the second set of replicates. Multiple frequencies were tested at one time (one per Plexiglas test unit), and replicated in time. These frequencies are listed in Tables 1 and 2.

Testing Results

Recorded results from directing movement of *C. formosanus* using radio waves (e.g. electromagnetic fields) at VLF (3-30 kHz) and ULF (300-3000 Hz) frequencies at Mississippi State University (MSU) Formosan Termite Research Facility in McNeill, Miss. (January-March 2005) are shown in Table 1 and Table 2. Mortality for test date Feb. 02, 2005 was high because the termites escaped before 14 days except in the chamber that held the 3000 Hz coil. Therefore, numbers for replicate test one are based on 7 day recordings. Mortality was 10% for replicate date Mar. 03, 2005 and 5% for replicate date Mar. 16, 2005. Ultra-low frequency (ULF) 1000 Hz had a higher percentage of FST on the coil than any other tested frequency tested in the series of: ULF 2000 Hz, VLF 3000 Hz and 4000 Hz. VLF 4000 Hz never had termites on the coil at the end of the elapsed time of the 14-day test periods. ULF 2000 Hz and VLF 3000 Hz had a higher percentage of FST termites on these VLF and ULF coils than the controls.

Test results for test period Apr. 15, 2005 using SLF and ELF are impressive and are shown in Table 3. Two of the frequencies tested had complete, greater than ULF 1000 Hz, control directing the behavior of FST. SLF of 300 Hz and ELF of 30 Hz had 100% of the termites on the coil after the allotted 14-day time period. Low frequency 30 kHz showed little control over the behavior of the FST, having only one half of the FST (50%) on the coil.

Soldier to worker ratio 20%:80% was attempted with FST throughout the replicates. Cold weather throughout the months of January and February limited available termites. Weather below 40° F. caused the *C. formosanus* to migrate into the ground, and at this temperature termites were occasionally found in the centers of buried, fallen timber. On the mornings of February 17, March 2, and March 16, temperatures were at or below 40° F. which made termites sparse. Therefore, termites that were available were used and noted in tests. The limited amounts of termites made it difficult to obtain the desired number of soldiers, but 800 workers were constant in every experiment. Once termites were placed in the chamber, keeping the chambers sealed with one main respiration vent and a constant room temperature at 85° F. was the best situation for limiting termite mortality, keeping them comfortable throughout the test. Once poured inside the containers, the termites initially dispersed in every direction.

Figure 3:
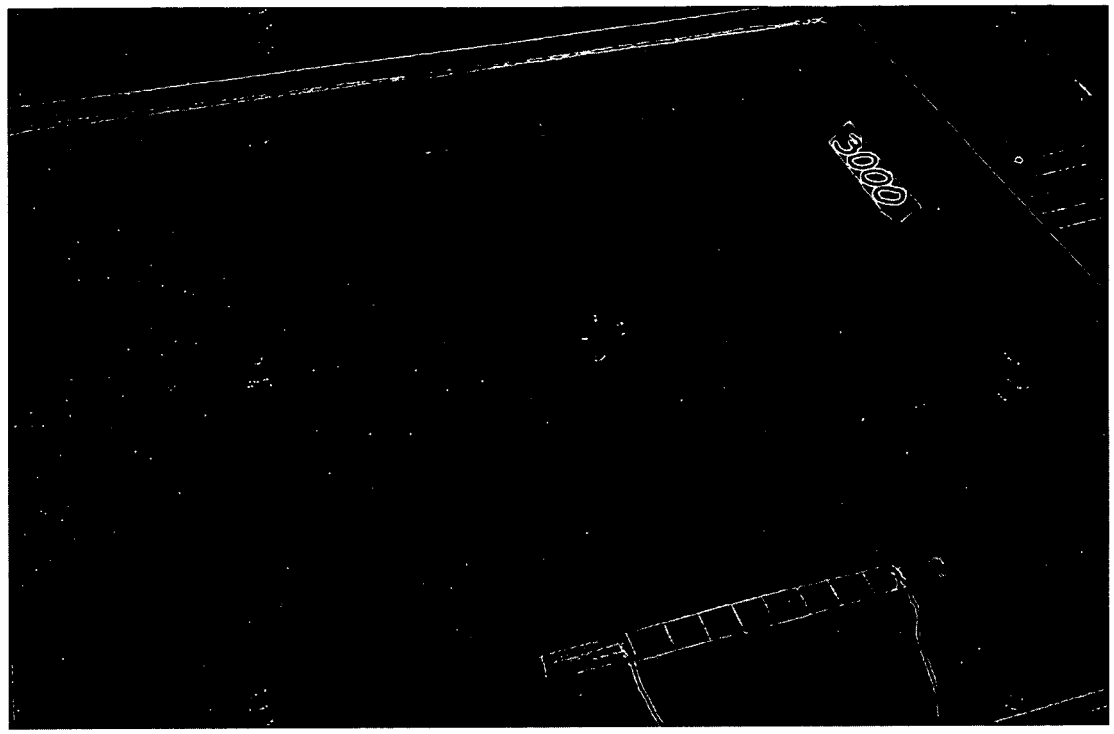
FIGS. 3 shows termites at an introduction point of a test chamber.
Figure 4:
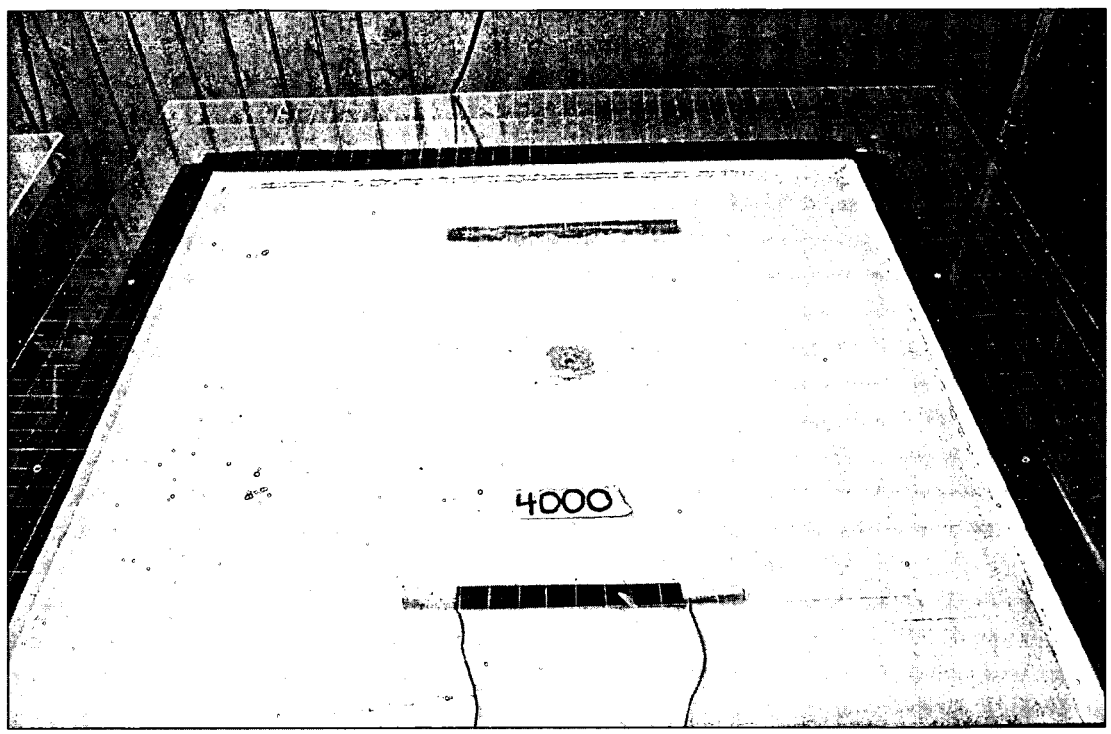
FIG. 4 shows that there are no termites on a source producing electromagnetic fields at 4000 Hz with an intensity of 1 milliwatt to 1 kilowatt indicating repellency, directing 100% FST to the control in replicated 14-day studies.
Figure 5:
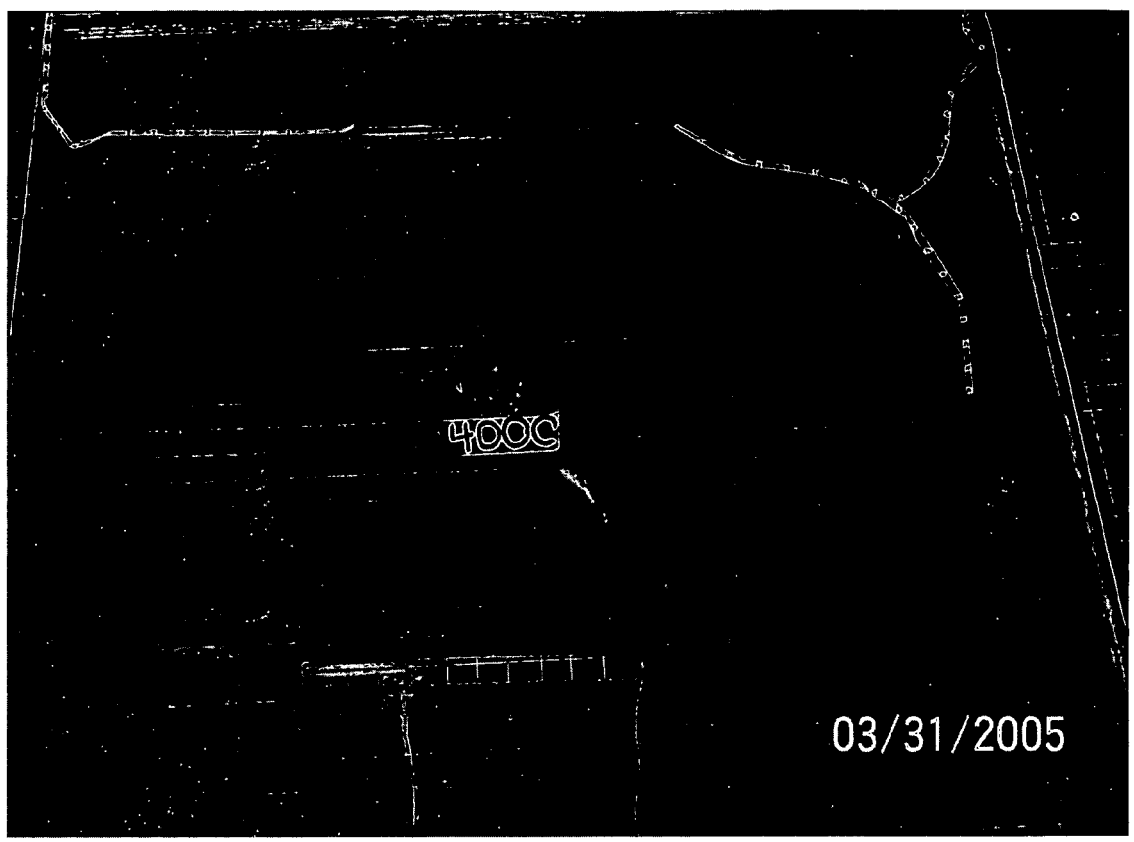
FIG. 5 shows VLF 4000 Hz test chamber, there is no FST foraging within 11.5" (29.21 cm) of the #1 source producing electromagnetic fields at 4000 Hz.
Figure 6:
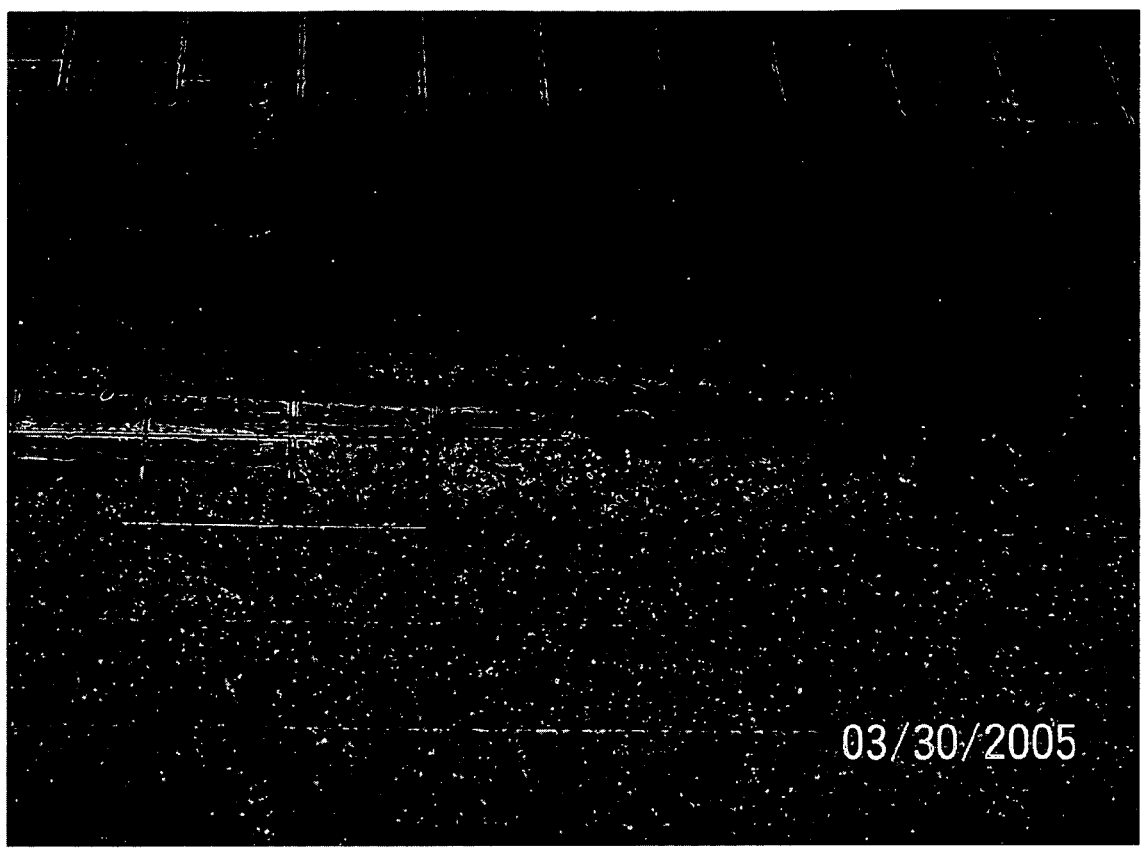
FIG. 6 shows a VLF 4000 Hz test chamber, 100% FST are on the control and no FST are on the source producing electromagnetic fields at 4000 Hz.

As shown in FIG. 3, the termites found the control wood easily and it appeared that they were eventually "pushed" in large numbers to the control within the first few hours and away from the VLF 4000 Hz source. There were a few termites on the coil initially when the FST were introduced into the test chamber. After a couple of hours, the few termites left the coil and no FST ever returned to the unit for 14-day test period (FIG. 4). In one replicate, the termites tunneled around the perimeter of the chamber (this did not occur in all tests) and never got within 11.5 inches (29.21 cm) of the test unit for test period Mar. 16, 2005 and did not occupy the shelter tubes at the end of 14-day elapsed time period of the test (FIG. 5). In three replicates, the coil operating at VLF 4000 Hz never had termites (0% of FST) and the control was completely colonized in every replicate (FIG. 6).

Figure 7:
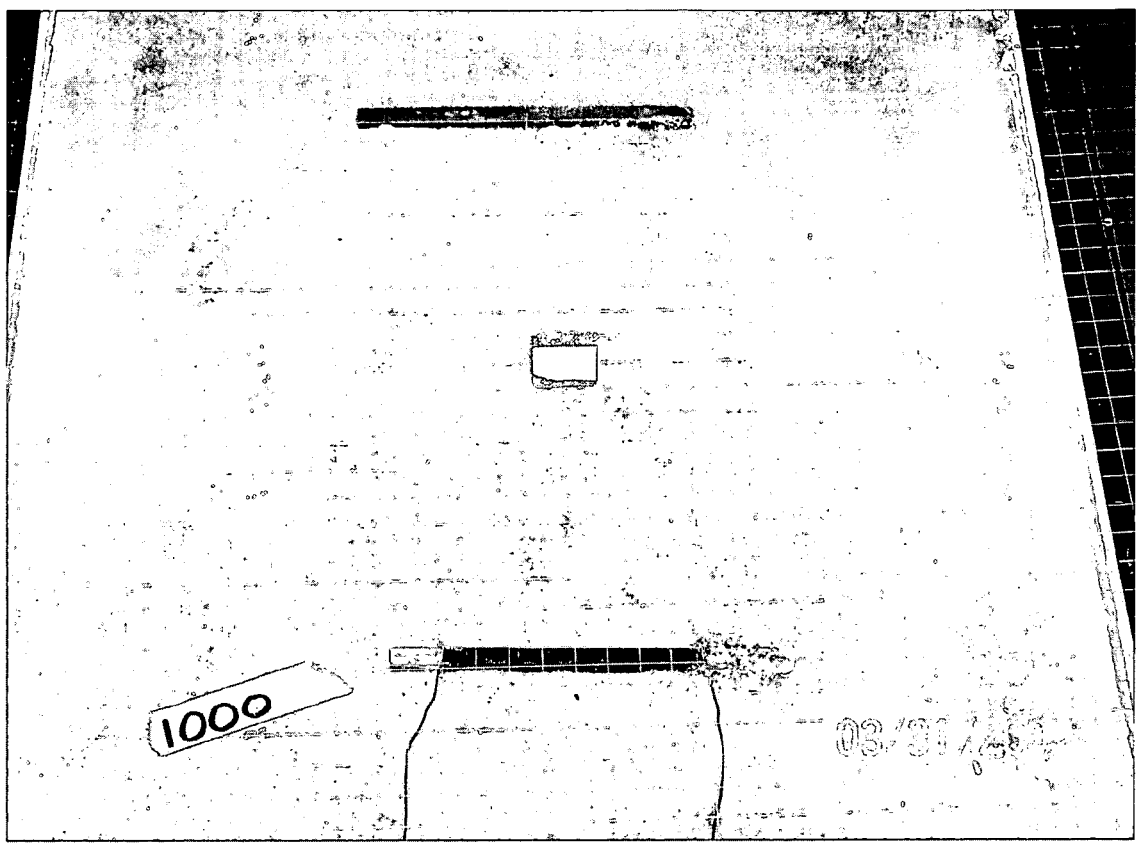
FIG. 7 shows that, in an ultra-low frequency test chamber, 95% of FST are directed to the source producing electromagnetic fields at 1000 Hz and an average of 88% FST are directed to the electromagnetic field source verses the control after 14-day replicated studies.
Figure 8:
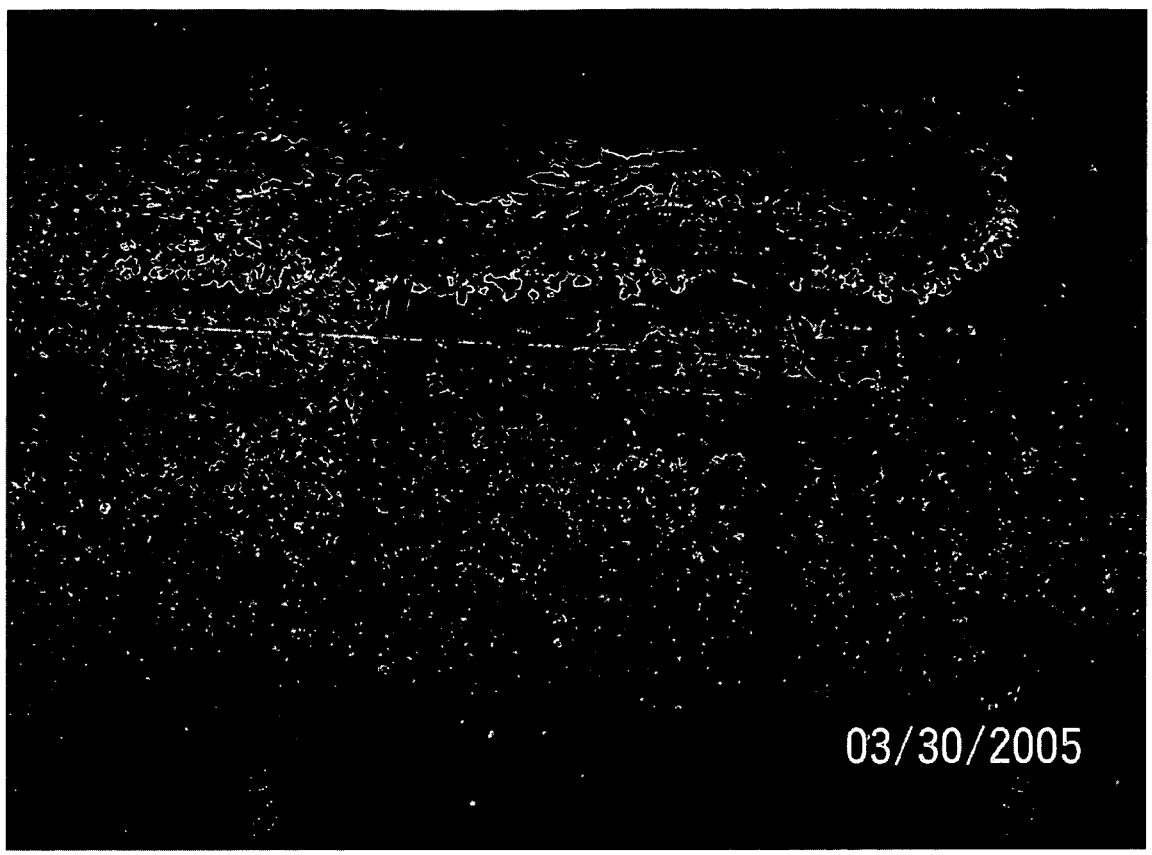
FIG. 8 is a closer view of the ULF source directing FST to a source producing electromagnetic fields at 1000 Hz.

Upon introduction into the ULF 1000 Hz test chamber, FST acted very similar as termites had in other test frequency ranges, but slightly more termites accumulated on the coil. After a couple of hours the termites were directed to the coil. At the end of 14-day test period in replicated studies, almost every living termite was on, under or inside the coil (88.8% of FST) as seen in FIGS. (7-8). There was an average of 137 FST on the control wood at the end of the 14-day elapsed test period in the replicated tests seen in FIGS. 7 and 8.

Figure 9:
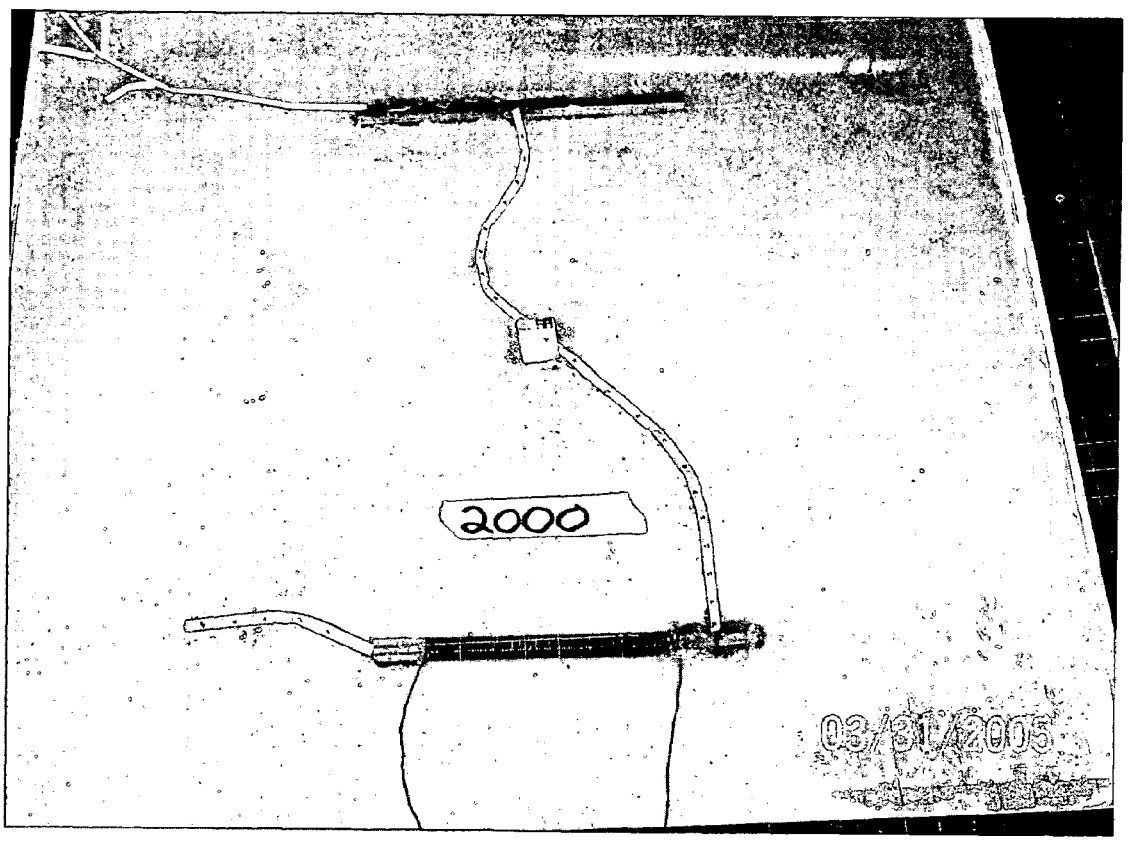
FIG. 9 is an ULF 2000 Hz test chamber, in which 85% of the FST are directed to a source producing electromagnetic fields at 2000 Hz and an average of 78% FST are directed to the electromagnetic field source verses the control after 14-day replicated studies.
Figure 10:
FIG. 10 shows, in an ULF 2000 Hz test chamber with a large shelter tube built from the center of the test chamber from the control to the source producing electromagnetic fields at 2000 Hz.
Figure 11:
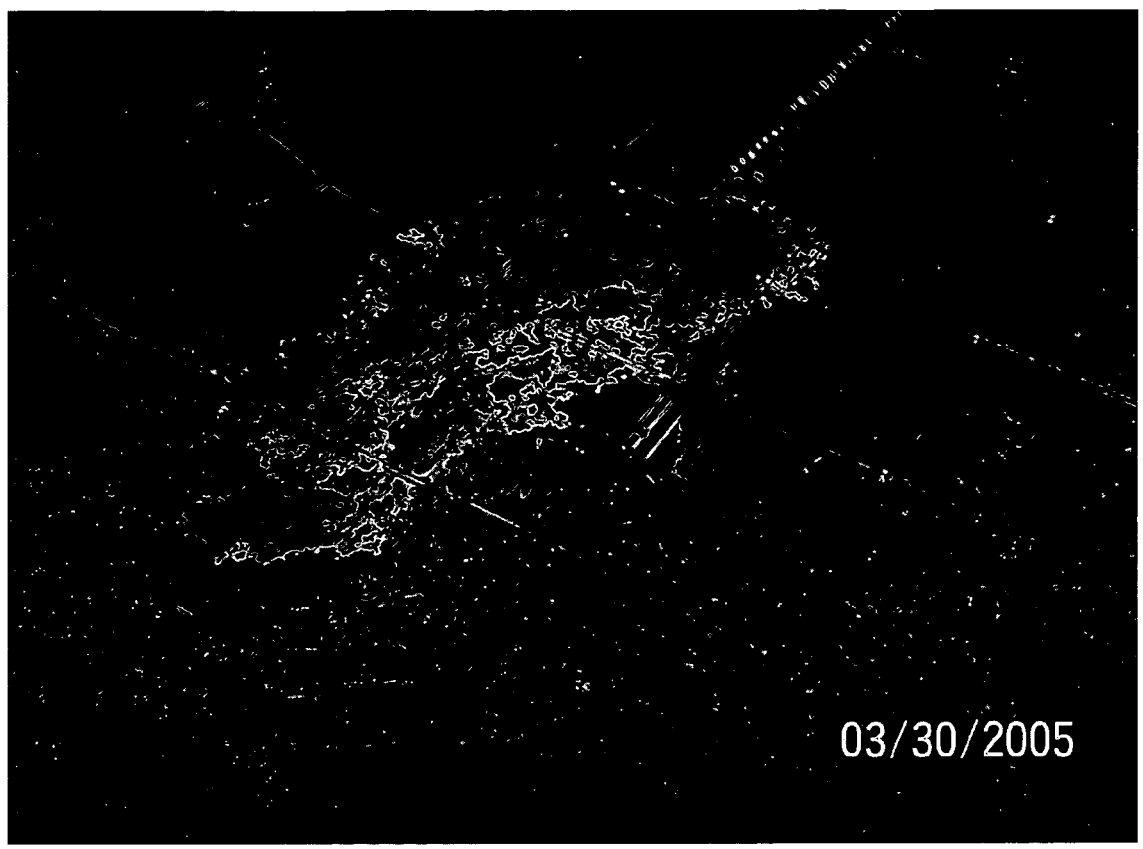
FIG. 11 is an up close view of FST on the source producing electromagnetic fields at 2000 Hz.
Figure 12:
FIG. 12 shows, in a VLF 3000 Hz test chamber, foraging to a source producing electromagnetic fields at 3000 Hz from the control in a direct pattern which had 90% of FST directed to the source versus the control and averaged 87% after 14-day replicated studies.
Figure 13:
FIG. 13 shows FST on/in the source producing electromagnetic fields at 3000 Hz.
Figure 14:
FIG. 14 shows, in a VLF 3000 Hz test chamber, FST underneath the electromagnetic field source.
Figure 15:
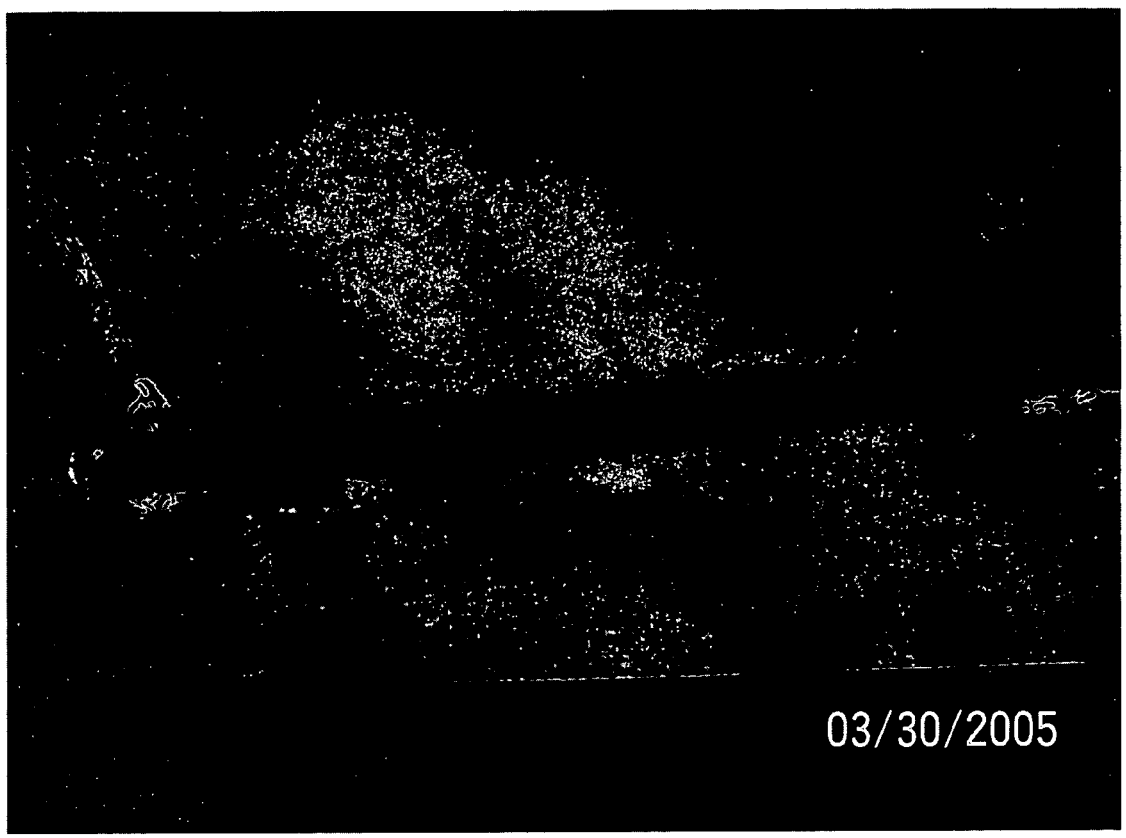
FIG. 15 shows, in a VLF 3000 Hz test chamber, the underside of the electromagnetic field source with FST tunneling to the electromagnetic field source.
Figure 16:
FIG. 16 is a close up view of the underside of the VLF 3000 Hz test chamber.

Upon introduction into the ULF 2000 Hz test chamber, the termites initially reacted similar to VLF 1000 Hz except termites would find the control, colonize it and then tunnel back to the middle of the box where they had been introduced. FST would then tunnel to the experimental unit (ULF source). There were more FST on, under, and in the experimental unit (86.6%) than the control after 14-day replicated studies shown in FIGS. 9-11.

The introduction of FST into the VLF 3000 Hz test chambers produced results unlike any of the other experiments. Once introduced, every FST foraged to the control for almost twenty-four hours. After a day had passed the termites began to forage from the control wood to the VLF coil. On the 14th day of the study, more FST were on, under and in the experimental unit (89.6%) than the control unit in replicated tests shown in FIGS. 12-16.

Figure 17:
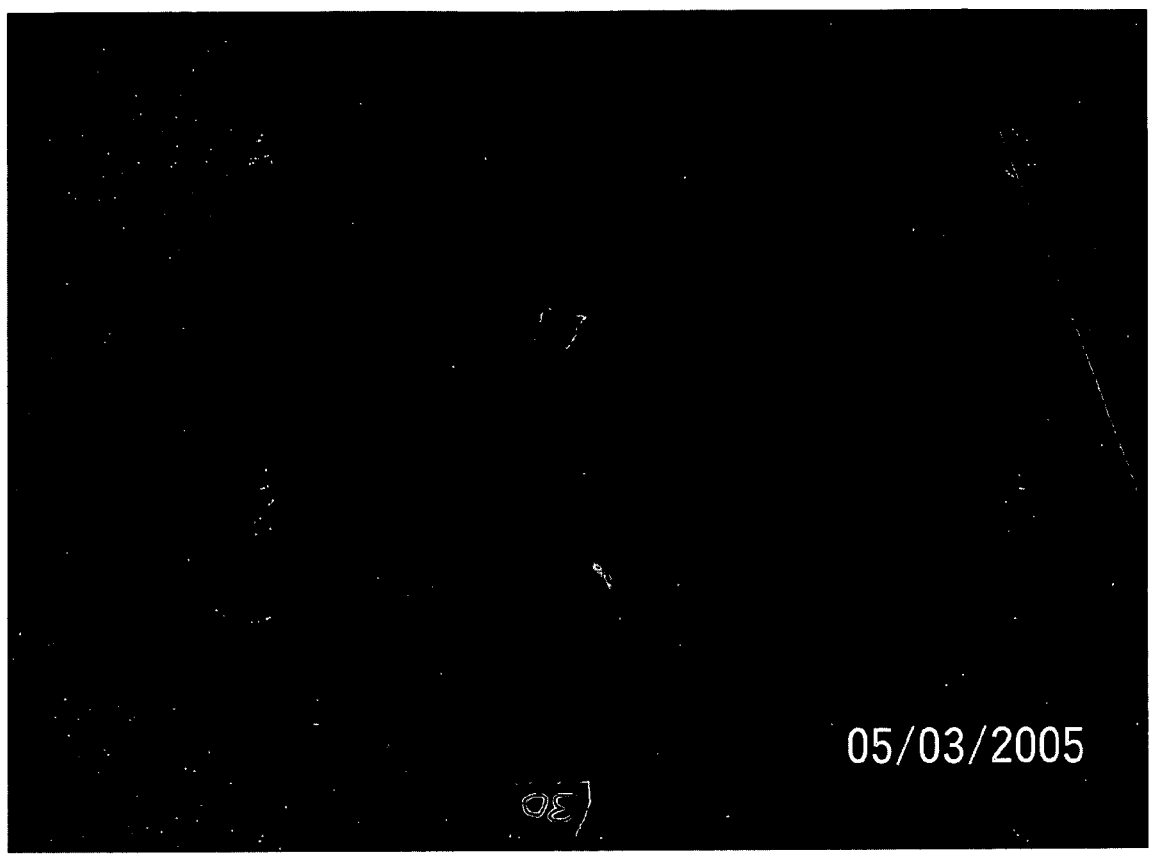
FIG. 17 shows an ELF/SLF 30 Hz test chamber with 100% of FST directed to the source producing electromagnetic fields at 30 Hz and no termites on the control after the 14-day replicated studies.
Figure 18A:
FIG. 18A is a bottom view of a control in an ELF/SLF 30 Hz test chamber showing no visible termites.
Figure 18B:
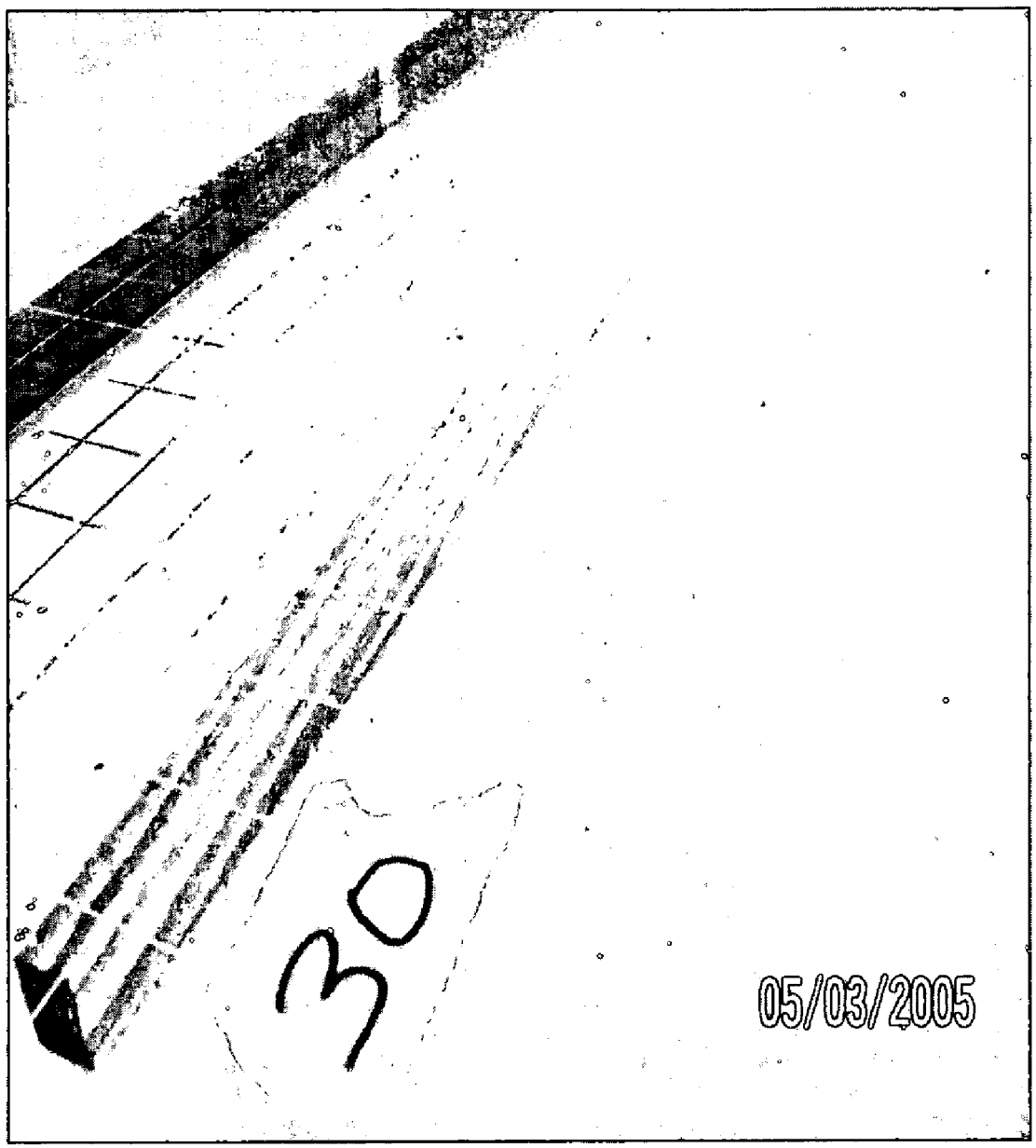
FIG. 18B is a top view of the control of FIG. 18A in an ELF/SLF 30 Hz test chamber showing no visible termites on the control after 14-day replicated studies.
Figure 19A:
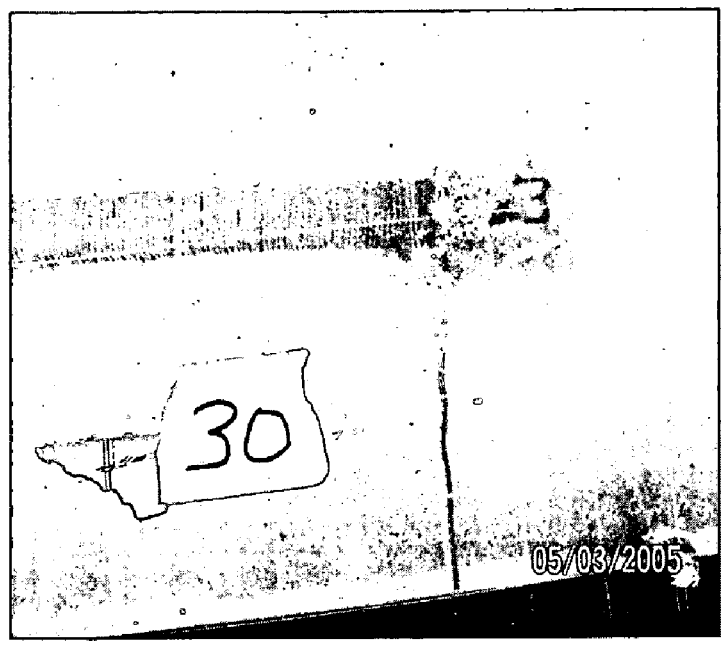
FIG. 19A is a top view of the right side of ELF/SLF 30 Hz electromagnetic field source and FIG. 19B is a top view of the left side of /SLF 30 Hz electromagnetic field source.
Figure 19B:
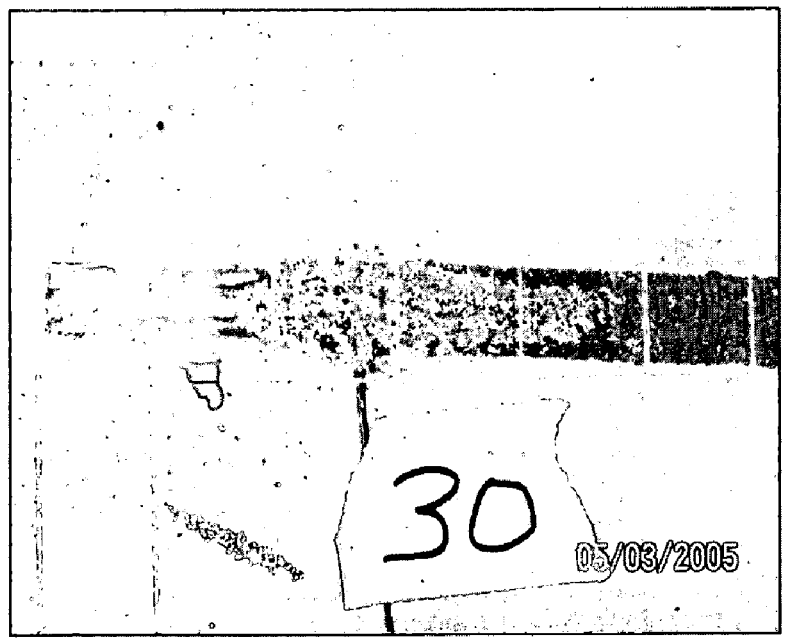
Figure 20:
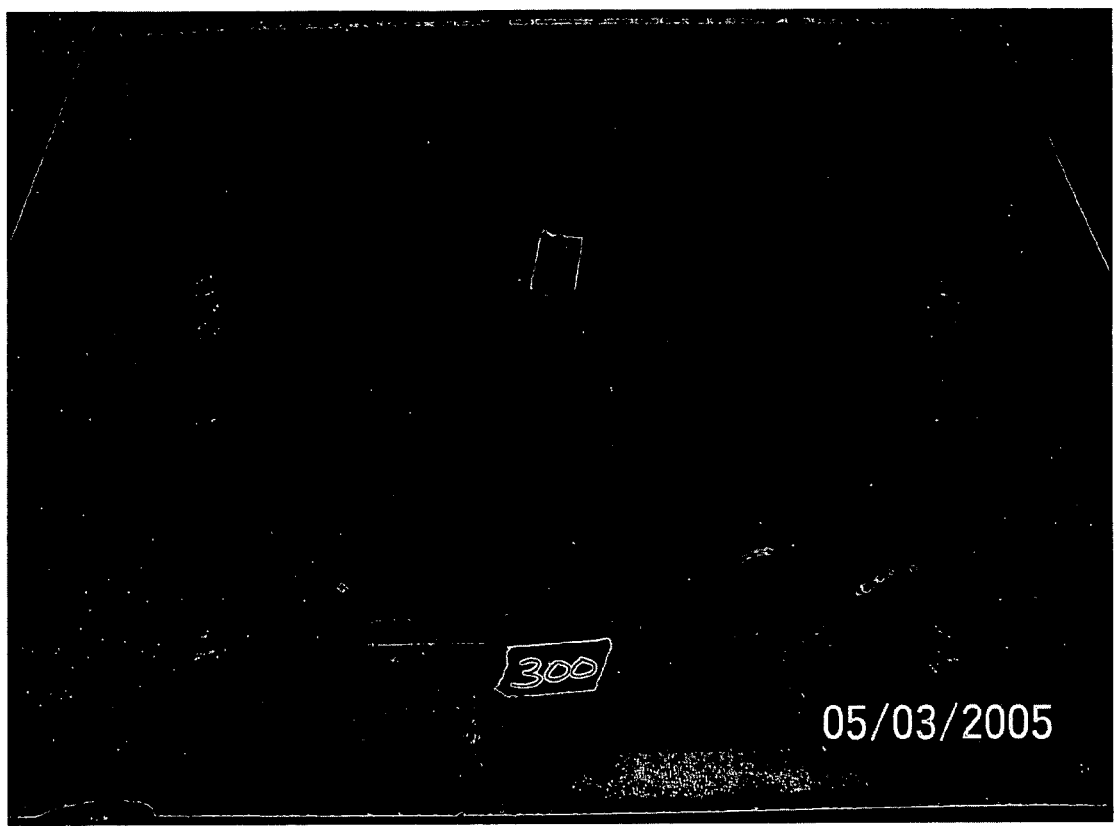
FIG. 20 is a SLF/ULF 300 Hz test chamber showing 100% of the termites directed to the source producing electromagnetic fields at 300 Hz and no termites on the control after 14-day replicated studies.
Figure 21A:
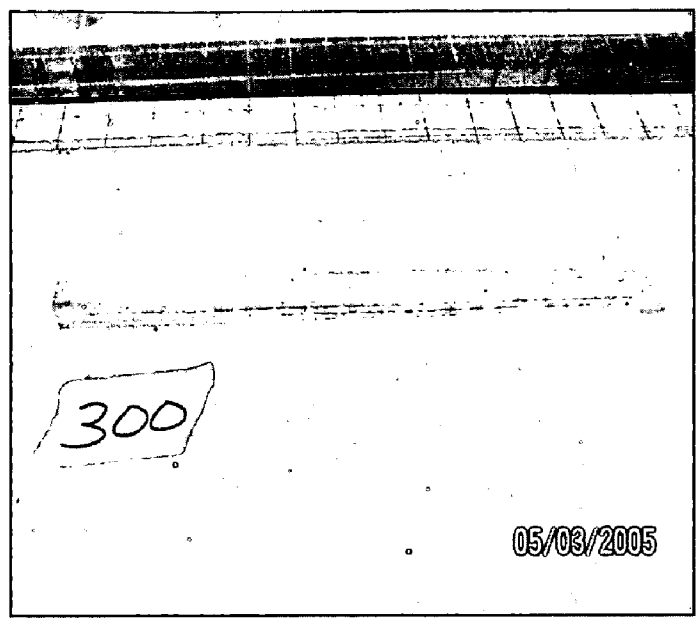
FIGS. 21A and 21B are the top view and bottom view, respectively, of a SLF/ULF 300 Hz test chamber non-energized control that showed no termite activity after 14-day replicated studies.
Figure 21B:
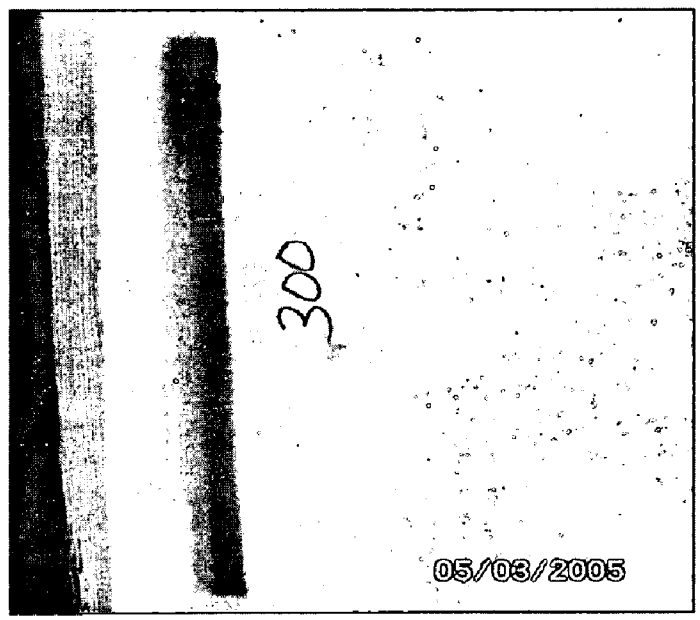
Figure 22A:
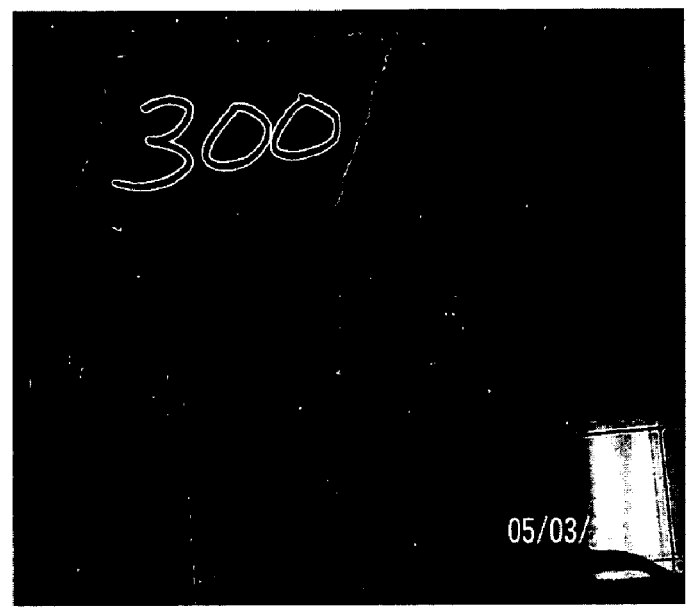
FIGS. 22A and 22B are the top view and bottom view, respectively, of a SLF/ULF 300 Hz electromagnetic field source that had 100% of the termite activity after the 14-day replicated studies.
Figure 22B:
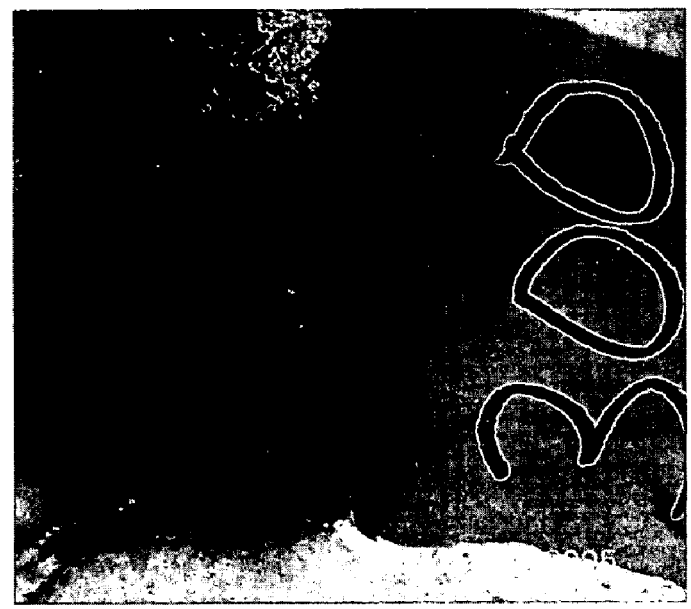

Based on these results, further tests were performed using SLF at 30 Hz and ELF at 300 Hz. The SLF 30 Hz coil had every living FST in the test chamber on the SLF coil (100% FST on the coil, FIGS. 17-19). ELF 300 Hz coil also directed every living FST to the coil, altering their behavior (100% FST on the coil, FIGS. 20-22). These frequencies as well as the VLF frequencies would be similar to the ones used for tactical submarine communications that have been shown to direct FST behavior.

Figure 23:
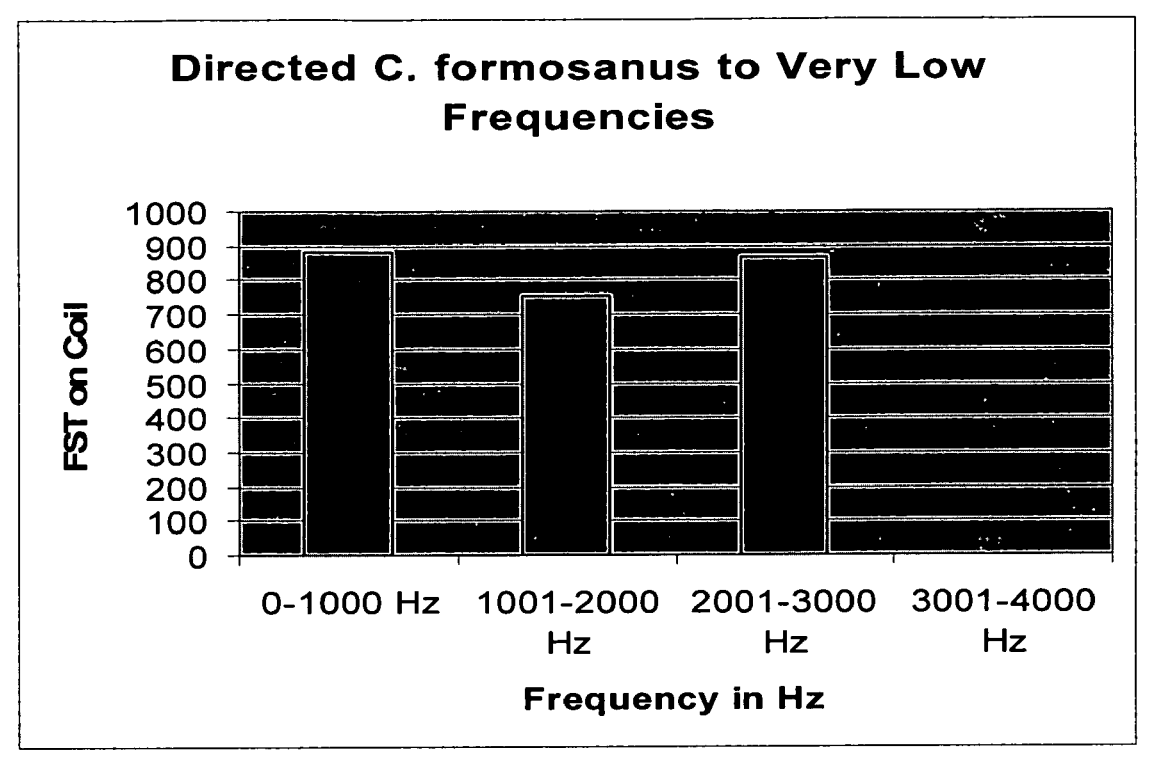

FIG. 23 summaries the results from the above-described experiments. Similar results were also obtained with *Reticulitermes flavipes*. As shown in FIG. 23, radio waves (e.g. electromagnetic fields) in the frequency range of 1-3000 Hz are very effective in attracting termites and it is believed that radio waves (e.g. electromagnetic fields) in this frequency range will attract other social insects such as ants, bees and wasps.

TABLE 1

Results from Replicates.

| Frequency (Hz) | Termites/Comments | Date |
|---|---|---|
| | Colony in McNeill Down Log | (Feb. 2, 2005)-(Feb. 15, 2005) |
| 4000 | 800 Workers = 3.31 g | Termites escaped but escaped away |
| | 181 Soldiers = 0.66 g | from the test coil. 100% Mortality. |
| | (18.4% out of 981) | |

TABLE 1-continued

Results from Replicates.

| Frequency (Hz) | Termites/Comments | Date |
|---|---|---|
| 3000 | 800 Workers = 2.95 g<br>200 Soldiers = 1.01 g<br>(20% out of 1,000) | Termites escaped but about 850 @ 7-days & 600 @ 14 days were on the coil. 30% Mortality. |
| 2000 | 800 Workers = 3.18 g<br>200 Soldiers = 0.57 g<br>(20% out of 1,000) | Termites grazed on coil (700-7 days) but left; after 14 days escaped on the coil side. 100% Mortality. |
| 1000 | 800 Workers = 3.12 g<br>200 Soldiers = 0.92 g<br>(20% out of 1,000)<br>Colony McNeill Live Tree | Termites grazed on coil (750-7 days) but left after 14 days; escaped on coil side. 100% Mortality<br>(Mar. 3, 2005)-(Mar. 15, 2005) |
| 4000 | 800 Workers<br>075 Soldiers<br>(8.6% out of 875) | Termites (787) were all on the control wood away from the coil. Mortality was 10% |
| 3000 | 800 Workers = 2.95 g<br>170 Soldiers = 1.01 g<br>(17.5% out of 970) | Termites (742) were on the coil, Mortality was 10%.<br>Control = 131 |
| 2000 | 800 Workers = 3.18 g<br>110 Soldiers = 0.57 g<br>(11.3% out of 910) | Termites (541) were on the coil, Mortality was 15%.<br>Control = 107 |
| 1000 | 800 Workers = 3.12 g<br>082 Soldiers = 0.92 g<br>(9.3% out of 882)<br>Colony Derby Train Depo | Termites (754) were on the coil, Mortality was 10%.<br>Control = 128<br>(Mar. 16, 2005)-(Mar. 30, 2005) |
| 4000 | 800 Workers = 3.31 g<br>100 Soldiers = 0.66 g<br>(11.1% out of 900) | No termites were on the coil (855), about 5% mortality. |
| 3000 | 800 Workers = 2.95 g<br>100 Soldiers = 1.01 g<br>(11.1% out of 900) | Termites on coil (753) with the rest back and forth between middle and control, Mortality 7%.<br>Control = 84 |
| 2000 | 800 Workers = 3.18 g<br>100 Soldiers = 0.57 g<br>(11.1% out of 900) | Termites on coil (726), Mortality 5%.<br>Control = 129 |
| 1000 | 800 Workers = 3.12 g<br>100 Soldiers = 0.92 g<br>(11.1% out of 900) | Termites almost all in coil (787), Mortality 8%.<br>Control = 41 |

TABLE 2

Summary of Table 1 results.

| Frequency (Hz) | Results (FST attracted to coil) | Date |
|---|---|---|
| 4000 | 0 | (Feb. 2, 2005)-(Feb. 15, 2005) |
| 3000 | 85% | |
| 2000 | 70% | |
| 1000 | 75% | |
| 4000 | 0 | (Mar. 3, 2005)-(Mar. 15, 2005) |
| 3000 | 85% | |
| 2000 | 70% | |
| 1000 | 95% | |
| 4000 | 0 | (Mar. 16, 2005)-(Mar. 30, 2005) |
| 3000 | 90% | |
| 2000 | 85% | |
| 1000 | 95% | |
| Mean Results | | February-March |
| 4000 | 0 | |
| 3000 | 86.6% | |
| 2000 | 78.3% | |
| 1000 | 88.8% | |

TABLE 3

Test results for period starting Apr. 15, 2005.

| Frequency (Hz) | Results (FST attracted to coil) | Date |
|---|---|---|
| 30,000 | 50% | (Apr. 15, 2005)-(May 05, 2005) |
| 3000 | Top of the test chamber lost its seal and dried out near the coil. About 100 termites remained in the coil despite the low moisture and the rest moved to the control where the moisture was. The power had also been lost for two days during the test. | (Apr. 15, 2005)-(May 05, 2005) |
| 300 | 100% | (Apr. 15, 2005)-(May 05, 2005) |
| 30 | 100% | (Apr. 15, 2005)-(May 05, 2005) |

The above description is for the purpose of teaching the person of ordinary skill in the art how to practice the present invention, and it is not intended to detail all those obvious modifications and variations of which it will become apparent to the skilled worker upon reading the description. It is intended, however, that all such obvious modifications and variations be included within the scope of the present invention, which is defined by the following claims. The claims are intended to cover the claimed components and steps in any sequence which is effective to meet the objectives there intended, unless the context specifically indicates the contrary.

What is claimed is:

1. A method of directing termite movement toward an antenna portion of an electromagnetic field source and a termite food source/attractant in proximity to a target location, said target location being inhabitable by termites, the method comprising the step of:

emitting an electromagnetic field from said antenna portion of said electromagnetic field source at a frequency of less than 4000 Hz that attracts termites to said antenna portion, wherein the termites are attracted by said electromagnetic field away from said target location and toward said electromagnetic field source and termite food/attractant, wherein said termite food source/attractant comprises a termite bait, and wherein said termite bait is a toxic bait.

2. The method of claim 1, wherein said termite food source/attractant comprises a material selected from the group consisting of a natural wooden object, a man-made wooden object, a termite-degradable object, a termite bait material, and a structure that includes a wooden or cellulose-containing component.

3. The method of claim 1, wherein said step of emitting an electromagnetic field further comprises emitting said electromagnetic field at a frequency of about 1 Hz to about 3000 Hz.

4. The method of claim 1, wherein said step of emitting an electromagnetic field further comprises emitting said electromagnetic field at a frequency of about 1 Hz to about 1000 Hz.

5. The method of claim 4, wherein said step of emitting an electromagnetic field further comprises emitting said electromagnetic field at a frequency of about 300 Hz.

6. The method of claim 4, wherein said step of emitting an electromagnetic field further comprises emitting said electromagnetic field at a frequency of about 30 Hz.

7. The method of claim 1, wherein said step of emitting an electromagnetic field further comprises emitting said electromagnetic field at an intensity of less than 1 kilowatt.

8. The method of claim 7, wherein said step of emitting an electromagnetic field further comprises emitting said electromagnetic field at an intensity of less than 1 watt.

9. The method of claim 7, wherein said step of emitting an electromagnetic field further comprises emitting said electromagnetic field at an intensity of about 1 milliwatt to about 1 kilowatt.

10. A method of protecting a target area from termite activity comprising:

positioning an electromagnetic field source capable of emitting an electromagnetic field at a frequency in a range of about 1 Hz to 3000 Hz and at an intensity of about 1 milliwatt to 1 kilowatt that attracts termites and a termite food source/attractant in a location adjacent to said target area, wherein said termite food source/attractant comprises a termite bait, and wherein said termite bait is a toxic bait; and emitting an electromagnetic field from said electromagnetic field source at said frequency and at said intensity, wherein said termites are attracted toward said location and away from said target area, thereby protecting said target area from termite activity.

11. The method of claim 10, wherein said step of emitting an electromagnetic field further comprises emitting said electromagnetic field at a frequency of about 1 Hz to 300 Hz.

* * * * *